United States Patent Office 3,284,085
Patented Nov. 8, 1966

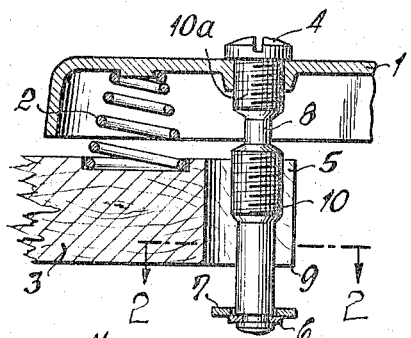
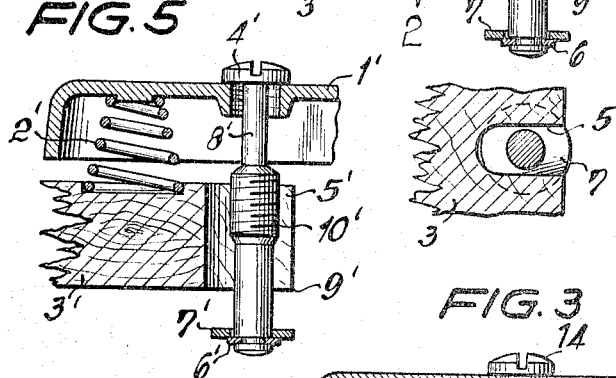
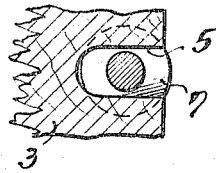
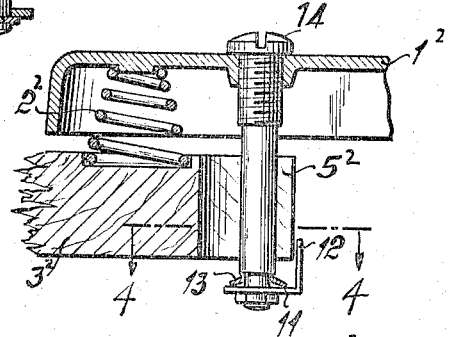
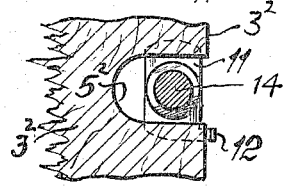

3,284,085
SAFETY TRANSPORT DEVICE FOR PHONOGRAPHS
Heinrich Zimmermann and Helmut Laufer, both of St. Georgen, Black Forest, Germany, assignors to Dual Gebruder Steidinger, a corporation of Germany
Filed Mar. 17, 1964, Ser. No. 352,518
Claims priority, application Germany, Mar. 21, 1963, St 20,425
4 Claims. (Cl. 274—39)

The present invention relates to a transport safety device for phonographs in general, and to such device, which is equipped with a base plate spring-supported upon a base board, in particular.

Screw members, which can be tightened from the top of the base plate, sit in the latter, which screw members project through recesses in the base board and which carry below the latter a disc, which is larger than the recess in the base board.

Such devices are used on phonographs resiliently engaging a base board. They are arranged such, that upon rotation of the screw members, selectively, the base plate is tightened with the base board, the base plate has a limited freedom of movement for the purpose of resiliency with simultaneous safety against removal or the base plate is permitted to be completely separated.

A known device of this type is arranged such, that the disc is removable from the screw element. This requires, however, that the device can be used only where the base board is accessible from below during the assembly or disassembly of the phonograph. In accordance with another known device, the disc is retained on the screw element, on the one hand, by means of a thread, and on the other hand, by means of a spring safely against rotation on the base board. The time required for mounting this device is extremely long.

It is furthermore known to tighten container covers on the container such, that screw elements tiltably secured to the latter can be tilted and are screwable in slots provided on the periphery of the cover. Such device, if applied to phonograph, would, however, not solve the problems to be solved in the present field.

It is, therefore, one object of the present invention to provide a transport safety device for phonographs, wherein the mounting of the phonograph during its assembly and disassembly is simplified by avoiding any handling of loose parts and in which no parts are to be secured to the base board and an accessibility of the lower side of the mounting plate is not required.

With this and other objects in view, which will become apparent in the following detailed description, the present invention will be clearly understood in connection with the accompanying drawing, in which:

FIGURE 1 is an axial section of a part of a phonograph base plate and a base board with one of the connecting screw elements;

FIGURE 2 is a section along the lines 2—2 of FIG. 1;

FIGURE 3 is an axial section of a part of a phonograph base plate disclosing a second embodiment of the connecting screw element;

FIGURE 4 is a section along the lines 4—4 of FIG. 3; and

FIGURE 5 is a vertical section of a portion of a phonograph base plate disclosing a third embodiment of the connecting screw element.

Referring now to the drawing, and in particular to FIGS. 1 and 2, the transport safety device for phonographs comprises a base plate 1 of a phonograph, which is supported on a base board 3 by means of bearing springs 2 and screw elements 4, one of which only is shown, are screwed into the base plate 1.

The screw element 4 projects through a sufficiently dimensioned and laterally open recess 5 of the base board 3. The screw element 4 carries a disc 7 below the base board 3, which disc 7 is retained by means of a safety disc 6. The shown position corresponds with the operating position of the phonograph. If the phonograph is to be assembled or disassembled, the screw element 4 is lifted up to its collar portion 8. It can then be moved from above into an inclined position to an extent, that the disc 7 can swing beyond the edge 9 of the base board 3, so that a removal in vertical direction is possible. For the purpose of the transport safety of the phonograph, the screw element 4 is screwed into the base plate 1 with its median thread portion 10 and turned to a level, until the disc 7 engages tightly the base board 3, the spring 2 is compressed and the base plate 1 is pressed onto the base board 3.

Referring now to the embodiment of FIG. 5, it will be quite apparent that the transport safety device for a phonograph is substantially identical with the embodiment shown in FIG. 1 and comprises again a plate 1', which is supported by means of bearing springs 2' on a base board 3' and screw elements 4' are screwed into the base plate 1'. The screw elements 4' again project through a sufficiently dimensioned and laterally open recess 5' of the base board 3' and also again, the screw element 4' carries a disc 7' below the base board 3', which disc 7' is retained by means of a safety disc 6'. The only distinction between the embodiment shown in FIG. 5 and that of the embodiment shown in FIG. 1 resides in the fact, that the screw elemnt 4 shown in FIG. 1 has in addition to the median thread portion 10 also a second thread portion 10ᵃ permitting of securing the screw element 4 to the base plate 1 also in its operative position of the phonograph, while in the embodiment shown in FIG. 5, the additional thread portion 10ᵃ is not provided and is deleted.

Referring now to FIGS. 3 and 4 of the drawing, an additional embodiment is disclosed, which comprises again a base plate 1² which is supported by bearing springs 2² in the base board 3². The base board 3² has again a sufficiently dimensioned and laterally open recess 5². A screw element 14 is also provided and threadedly connected with the base plate 1² and at the lower end of the screw element 14 is provided a disc 11, which in one dimensional direction is smaller and in the other dimensional direction is larger than the width of the open recess 5² of the base board 3². Furthermore, the disc 11 carries an upwardly directed lug 12, which extends into the range of the base board 3². The disc 11 is rotatably mounted on the screw element 14 by means of a spring disc 13 against a light friction moment. Prior to mounting of the base plate 1² of the phonograph onto the base board 3², the disc 11 is turned into such a position, that it can be moved through the recess 5². The screw element 14 is, thereby, turned at least for a quarter revolution out of the base plate 1². After the mounting of the base plate 1², it is tightened against the base board 3². It joins the disc 11 to this movement for such time, until the lug 12 comes into abutment with the base board 3², which corresponds with the operating position secured against removal. For the purpose of the transport safety, it is lifted out of the base plate 1². The lug 12 of the disc 11 engages thereby on the other side 13 of the recess 5² and retains the disc 11 as long, until it pushes from below against the base board 3². For the purpose of removal of the device, the screw element 14 is brought into a median position between the two abutment positions of the lug 12, so that the disc 11 can pass the opening 5².

While we have disclosed several embodiments of the present invention, it is to be understood that these em-

We claim:
1. A phonograph comprising
   a base plate,
   a base board disposed below said base plate,
   spring means disposed between said base plate and said base board and supporting resiliently said base plate on said base board,
   said base plate having at least one portion carrying inner thread extending therethrough,
   a screw member having a head portion and extending through said portion of said base plate carrying said inner thread,
   said base board having a laterally open recess extending therethrough and receiving a portion of said screw member,
   said screw member having a portion carrying outer thread and an enlargement disposed below said base board and being larger in one direction perpendicularly to the longitudinal axis of said screw member than the width of said laterally open recess of said base board, and
   said screw member having a portion of smaller outer diameter between said head portion and said portion carrying outer thread such that said screw member can be tilted about its longitudinal axis, upon moving said portion of smaller outer diameter into said portion of said base plate carrying inner thread, so that said enlargement of said screw member can be tilted outwardly from said laterally open recess of said base plate.

2. The phonograph, as set forth in claim 1, wherein said screw member has a second portion of outer diameter disposed between said head portion and said portion of smaller outer diameter.

3. A phonograph comprising
   a base plate,
   a base board disposed below said base plate,
   spring means disposed between said base plate and said base board and supporting resiliently said base plate on said base board,
   said base plate having at least one portion carrying inner thread extending therethrough,
   a screw member having a head portion and extending through said portion of said base plate carrying said inner thread,
   said base board having a laterally open recess extending therethrough and receiving a portion of said screw member,
   said screw member having a portion carrying outer thread and an enlargement disposed below said base board and being larger in one direction perpendicularly to the longitudinal axis of said screw member than the width of said laterally open recess of said base board, and
   said enlargement of said screw member comprises a rotatable locking member including an upwardly extending lug extending within the range of said base board, so that upon turning said screw member at least for a quarter revolution out of the base plate, said enlargement can be moved through said recess.

4. The phonograph, as set forth in claim 3, which includes
   a spring disc rotatably mounted on said rotatable locking member with slight friction.

References Cited by the Examiner
FOREIGN PATENTS 792,181   3/1958   Great Britain.
902,766   8/1962   Great Britain.

NORTON ANSHER, *Primary Examiner*.

C. B. PRICE, *Assistant Examiner*.